US012727714B2

(12) United States Patent
Molinaro et al.

(10) Patent No.: US 12,727,714 B2
(45) Date of Patent: Sep. 8, 2026

(54) DISPENSER OF COFFEE IN SOLID FORM

(71) Applicant: Luigi Lavazza S.p.A., Turin (IT)

(72) Inventors: Gabriele Molinaro, Turin (IT); Leonardo Sergio, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 52 days.

(21) Appl. No.: 18/702,486

(22) PCT Filed: Nov. 21, 2022

(86) PCT No.: PCT/IB2022/061203
§ 371 (c)(1),
(2) Date: Apr. 18, 2024

(87) PCT Pub. No.: WO2023/105329
PCT Pub. Date: Jun. 15, 2023

(65) Prior Publication Data

US 2024/0423417 A1 Dec. 26, 2024

(30) Foreign Application Priority Data

Dec. 6, 2021 (IT) ........................ 102021000030764

(51) Int. Cl.
*A47J 42/54* (2006.01)
*A47J 41/00* (2006.01)
*A47J 42/40* (2006.01)

(52) U.S. Cl.
CPC ........... *A47J 42/54* (2013.01); *A47J 41/0055* (2013.01); *A47J 42/40* (2013.01)

(58) Field of Classification Search
None
See application file for complete search history.

(56) References Cited

U.S. PATENT DOCUMENTS 4,605,175 A * 8/1986 Weber ..................... A47J 42/06 241/261.1
5,865,383 A * 2/1999 Ford ....................... A47J 42/40 241/36

(Continued)

FOREIGN PATENT DOCUMENTS

JP H03262096 A 11/1991
JP H06251238 A 9/1994

(Continued)

OTHER PUBLICATIONS

International Search Report for PCT/IB2022/061203, mailed Feb. 8, 2023, 4 pages.

(Continued)

*Primary Examiner* — Paul R Durand
*Assistant Examiner* — Michael J. Melaragno
(74) *Attorney, Agent, or Firm* — Nixon & Vanderhye P.C.; Lars H. Genieser

(57) ABSTRACT

A dispenser of coffee in solid form comprises: —a storage volume (10). to contain coffee beans (CB), —a dosing arrangement (11), set downstream an outlet (40*a*) of the storage volume (10) and prearranged for releasing dosed amounts of coffee beans (CB) from the storage volume (10), —a dispensing mouth (12), set downstream an outlet (11*a*) of the dosing arrangement (11), —a cooling arrangement, configured for cooling the coffee beans (CB) contained in the storage volume (10). The storage volume (10) comprises an inner container (40), for receiving and storing the coffee beans (CB), and the cooling arrangement comprises a first outer casing (41) which surrounds at least partially the inner container (40), at least part of a first gap (42) being defined between the inner container (40) and the first outer casing (41), the cooling arrangement further including a cooling device (20) of the first gap (42).

14 Claims, 6 Drawing Sheets

(56) References Cited

U.S. PATENT DOCUMENTS 6,095,032 A * 8/2000 Barnett ................... A47J 42/40 100/145
8,702,021 B2 * 4/2014 Bresciani ................ A47J 42/54 241/35
8,826,803 B2 * 9/2014 Mazzer ................... A47J 42/54 99/280
9,033,267 B2 * 5/2015 Carbonini ............... A47J 42/54 241/66
10,426,296 B2 * 10/2019 Ryan ....................... A47J 42/54
10,517,434 B2 * 12/2019 Lammers ................ A47J 42/46
11,864,689 B2 * 1/2024 Pachi ...................... A47J 42/40
2010/0011975 A1 * 1/2010 Mazzer ................. A47J 31/401 165/104.34
2012/0286078 A1 * 11/2012 Bresciani ................ A47J 42/54 241/25
2014/0123857 A1 * 5/2014 Rego ....................... A47J 31/42 99/280
2014/0299688 A1 * 10/2014 Carbonini ............... A47J 42/54 241/66
2016/0287016 A1 * 10/2016 Lammers ................ A47J 31/42
2016/0316970 A1 * 11/2016 Ryan ....................... A47J 42/40
2018/0310767 A1 * 11/2018 Abbiati ................... A47J 42/50
2019/0365140 A1 * 12/2019 Wallis ....................... B65B 1/36
2020/0288905 A1 * 9/2020 Ripperda ........... G05B 19/0423
2021/0401220 A1 * 12/2021 Schlack .................. A47J 31/41
2022/0000314 A1 * 1/2022 Pachi ...................... A47J 42/40
2023/0345959 A1 * 11/2023 Carbonini ................ H05B 6/80
2023/0345960 A1 * 11/2023 Carbonini ................. A23F 5/12
2024/0312286 A1 * 9/2024 Molinaro .............. G07F 13/065
2024/0315487 A1 * 9/2024 Colizza ................... A47J 42/44
2024/0423417 A1 * 12/2024 Molinaro ................ A47J 42/40

FOREIGN PATENT DOCUMENTS

JP 2003132420 A * 5/2003
JP 2007334518 A * 12/2007
JP 2009213658 A * 9/2009
JP 4893119 B2 1/2012
WO 2018186762 A1 10/2018

OTHER PUBLICATIONS

Written Opinion of the ISA for PCT/IB2022/061203, mailed Feb. 8, 2023, 6 pages.

* cited by examiner

DISPENSER OF COFFEE IN SOLID FORM

This application is the U.S. national phase of International Application No. PCT/IB2022/061203 filed Nov. 21, 2022, which designated the U.S. and claims priority to IT patent application No. 102021000030764 filed Dec. 6, 2021, the entire contents of each of which are hereby incorporated by reference.

TECHNICAL FIELD

The present invention refers in general to dispenser of bulk solid food products, and has been developed with particular reference being paid to coffee bean dispenser, which can be used in shops, large-scale distribution centers and sale commercial premises in general. The invention is also applicable with advantage to dispenser equipped with a grinding system, for dispensing coffee powder starting from coffee beans.

STATE OF THE ART

In the context of various types of commercial premises it is very common to prearrange structures that allow customers to serve themselves autonomously with bulk solid products. This is typically the case for foodstuffs such as fruit and vegetables for which—in shopping centers—special sales areas are prearranged, quipped for example with product displays/containers, bag and gloves dispensers, as well as scales for weighing the products and issuing a receipt, so that the consumer can freely choose the quantity and quality of the desired products.

Particularly in the large-scale retail sector, the use of dispensing devices and systems is spreading, to allow customers to directly buy solid bulk food products, such as seeds, rice, candies, small format pasta and, above all, coffee beans.

In first known solutions, which are constructively simpler, these dispensers consist essentially of a top-up storage volume, which contains a granular product in bulk form. The storage volume, usually a hopper or silo container, has a lower spout, upstream of which is located an opening/closing member operable by the consumer, which acts as a dosing arrangement. The consumer, operating on this member, can then unload in a bag a desired quantity of the product, evaluated by eye, and then weigh it or have it weighed on a corresponding scale, providing if necessary for any top-ups. The scale can possibly be prearranged for issuing a receipt.

In second known solutions, on the other hand, automated dispensers are provided which, following a setting carried out by the consumer on a user interface, provide for dispensing the bulk solid product in the desired quantity. To this end, the abovementioned opening/closing member is controlled in an automated manner and downstream of it, and upstream of the dispensing mouth, there is an arrangement for dosing the quantity to be dispensed, also automated. Automated dispensers of this type can also comprise several hopper or silo containers, and the consumer can select the type and quantity of the desired product on the user interface (see for example EP 0736279 A and WO 01/48711 A). The dispenser can also be equipped with a printer, suitable for issuing a receipt.

Where appropriate, in the case of certain products—such as coffee—the dispenser may include a grinding arrangement, downstream of the dosing arrangement, or the two arrangements in question may be integrated into a single functional unit.

Large-scale distribution centers are usually equipped with ambient temperature conditioning systems for the benefit of customers, but the temperatures thus obtained are not necessarily compatible with the preservation of certain exposed foodstuffs. Other types of shops are instead devoid of such air conditioning systems, with the consequence that the environment in which the dispenser is installed can take on high values of temperature, and possibly humidity.

Think of a dispenser installed in a small shop without an air conditioning system, where the summer ambient temperature can easily reach values above 30° C. In such circumstances, even higher temperatures and significant humidity rates may exist within the storage volume of the bulk solid product, which can adversely affect the quality of the product itself. This is particularly the case with coffee beans, which when exposed to high temperatures and humidity are subject to oxidative phenomena and loss of volatiles. This deterioration of the coffee beans inevitably results in a deterioration in the quality of the drink that will be then obtained from these beans, for example its flavor.

AIM AND SUMMARY

In its general terms, the present invention aims to indicate dispenser able to efficiently solve the drawback mentioned above, tied to possible existence of a high temperature and/or humidity within the storage volume of the coffee beans.

This purpose is achieved, according to the invention, by a dispenser of coffee in solid form having the characteristics indicated in the attached claims. The claims form an integral part of the technical teaching provided herein in relation to the invention.

BRIEF DESCRIPTION OF THE DRAWINGS

Further aims, characteristics and advantages of the invention will result from the description that follows, made with reference to the attached drawings, provided purely as a non-limiting example, wherein.

DESCRIPTION OF PREFERRED EMBODIMENTS

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment, "in various embodiments", and the like, that may be present in different points of this description, do not necessarily refer to one and the same embodiment. Furthermore, particular conformations, structures, or characteristics defined in the framework of the present description may be combined in any adequate way in one or more embodiments, that may even differ from the ones represented. The reference numbers and spatial references (such as "upper", "lower" "top", "bottom", etc.) used herein are merely for convenience and hence do not define the sphere of protection or the scope of the embodiments. The same reference numbers are used in the figures to indicate similar or technically equivalent elements.

In the description and the attached claims, the generic definition "coffee in solid form" is intended to designate a raw material or a beverage precursor which, depending on the case, is dispensed by the dispenser in beans or powdery form.

Figure 1:
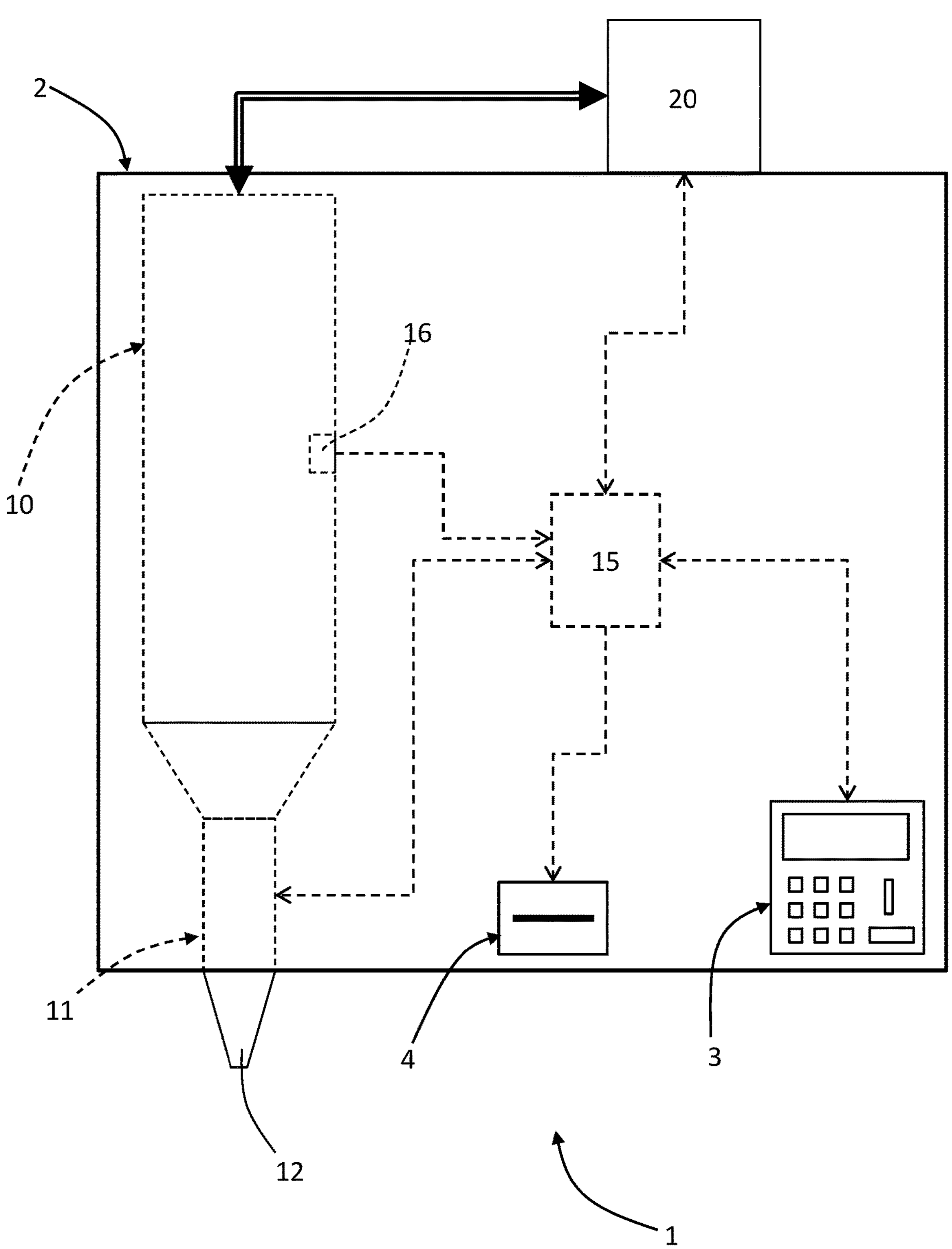
FIG. 1 is a schematic representation of a coffee bean dispenser according to possible embodiments of the invention.

Referring initially to FIG. 1, reference 1 designates as a whole a dispenser of coffee in solid form, in particular of the type intended to be installed in a generic commercial establishment. In the example considered, the dispenser 1 is an automated dispenser, but the principles of the invention, described below, are also applicable in the case of dispensers wherein the dosing operations are carried out directly by a user, as in the first known solutions mentioned above.

The dispenser 1 has a generic supporting structure 2 which—in various embodiments—has a user interface 3 associated thereto, through which a user can set the request for coffee beans that can be dispensed by the dispenser. For example, this interface 3 may comprise a display and a series of selection keys. The dispenser 1 can also be equipped with a printer 4, for issuing a receipt.

The structure 2 supports a storage volume 10, for the containment of coffee beans. The volume 10 has a lower outlet opening, downstream of which a dosing arrangement 11 is provided, of known design and operation, for dosing a dosed quantity of coffee beans, and for its subsequent dispensing via a mouth or dispensing nozzle 12.

The dosing arrangement can be of any known type, for example of a motorized volumetric type and/or sectional, or of a completely manual type, for example operated with a lever or a tap.

For illustrative purposes only, a possible volumetric system that can be used is the one described in WO 01/48711 A; alternatively, a screw doser can also be used, as described in EP 0736279 A.

In preferred embodiments, the arrangement 11 defines at least one dosing volume which corresponds—on the basis of average size and average weight of coffee beans—to a substantially predefined quantity of coffee beans, e.g., 250 grams. The volume is provided with an inlet and an outlet, both equipped with a respective shut-off device (for example belonging to a hinged valve or electrically controlled gate valve) and where, for dosing purposes, the shut-off device associated with the outlet is closed and the shut-off device associated with the inlet is opened, while for the purpose of subsequent dispensing the shut-off device associated with the inlet is closed and the shut-off device associated with the outlet is opened, so that the substantially predefined amount of coffee beans can reach the mouth 12. As mentioned, the dosing system can also be manual, operable directly by the consumer or by an operator.

Dosing may be done in multiples of a predetermined dose. For example, in the case of manual dosing, the consumer or operator may operate on a dosing device in order to dispense the predetermined single dose into a predefined volume cup, and possibly repeat the operation until the desired total quantity is reached. The use of the aforementioned cup can also be foreseen if the dosage is carried out in an automated way, also in this case according to multiples of a predefined dose.

Reference 15 designates a dispenser control unit 1, comprising, for example, an electronic control card which manages the operation of various components or functional groups of the dispenser, such as printer 4 and dispensing arrangement 11, in a known manner, also as a function of commands or signals received from other elements of the dispenser 1, such as the user interface 3 and at least one temperature sensor 16 associated with the volume 10, which is also in signal communication with the unit 15, the function of which will be described below.

According to the invention, the dispenser 1 comprises a cooling arrangement, configured for cooling the coffee beans contained in the storage volume 10. In accordance with a characteristic of the invention, the cooling arrangement comprises a cooling device, designated as a whole by 20. The cooling device 20 is not necessarily associated with the supporting structure 2, since it may be located in position remote from the storage volume 10.

Following a request from a user via the user interface 3, the dosing arrangement 11 doses the set quantity of coffee beans.

Figure 2:
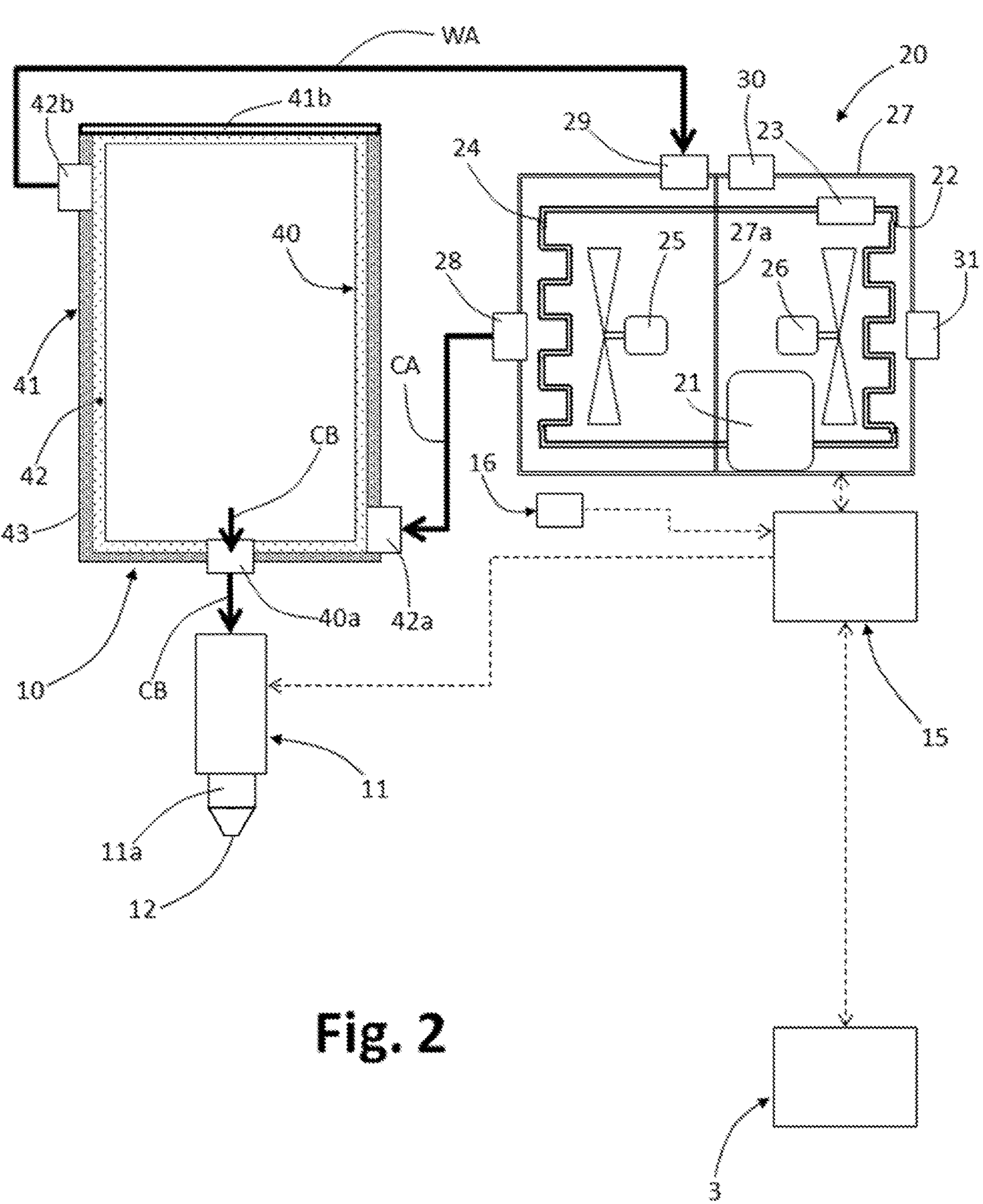
FIG. 2 is a schematic representation of some elements of a coffee bean dispenser according to possible embodiments of the invention.

Referring to FIG. 2, which shows only the elements useful for understanding the invention, the dosing arrangement therefore opens a lower outlet 40*a* of the storage volume 10, in order to enable the exit from the same volume of the coffee beans, as schematized by the arrows CB, which fill a dosing volume, having a respective lower outlet 11*a* kept in a closed state. The arrangement 11 then closes the outlet 40*a* and opens the lower outlet 11*a* of said dosing volume, releasing the bean dose to the dispensing mouth 12.

According to a feature of the invention, the storage volume 10 comprises an inner container, indicated by 40, for receiving and storing the coffee beans CB. The inner container 40 may, for example, consist of a hopper or silo container, preferably but not necessarily made of plastic, having a lower outlet 40*a*, for example a protruding outlet having a substantially cylindrical shape. The container 40 can have a containment volume of approximately between 1 and 10 litres, for example between 2 and 4 litres. The container 40 could also be a typical bag of coffee beans, equipped with a relatively rigid sleeve to define the outlet 40*a*, or else a rigid can having the outlet 40*a*.

Note that in the figures the outlet 40*a* of the container 40 and the dosage arrangement 11 are shown as spatially separated only for the sake of clarity of representation. In a practical embodiment, however, it is preferable that an outlet 40*a* of the container 40 is engaged or in any case coupled to a corresponding inlet of the dosing arrangement 11, or with the two components 40 and 11 directly adjacent and attached to each other, to constitute a sort of single unit (although the two parts are preferably separable, in order to enable the necessary removal of the container 40).

According to a further characteristic of the invention, the cooling arrangement comprises an outer casing, designated by 41, which at least partially surrounds the container 40, and between the container 40 and the outer casing 41 a cavity or gap is defined, designated by 42, having at least one inlet 42*a* and at least one outlet 42*b*.

In various embodiments, the outer casing 41 has a cross-sectional shape similar to that of the container 40, but larger, so as to surround the container 40 at least peripherally, preferably at a distance therefrom (without excluding possible areas of mutual contact). Preferably, the casing 41 also has a bottom wall, so that the gap 42 also extends at the bottom of the container 40; For this purpose, the bottom of the casing 41 may be provided with a lower opening, to enable the passage of the outlet 40A—if this is a protruding one—and in any case the functional connection of the outlet 40A with the inlet of the dosing arrangement 11.

Preferably, the outer casing 41 comprises a layer of thermally insulating material 43, particularly on its outer side, in order to minimize possible heat exchange towards the outside and therefore maximize the heat exchange towards the inside, i.e. towards the coffee beans. In various embodiments, the outer casing 41 is provided with an opening/closing element, such as door or lid which can be opened or removed, designated by 41*b*. Element 41*b* is intended to enable access to the container 40 for the purpose of replacing it or filling it with coffee beans; preferably, the opening/closing element 41*b* is also provided with a respective thermal insulation, for the same reasons as indicated above.

In various embodiments, the container 40 is configured as a container closed at the top, i.e. without an upper loading mouth: in these embodiments, the container 41 can therefore be conceived as a disposable refill container (for example a bag or a can), or as a refillable container, using the outlet 40*a* for filling thereof. In other embodiments not represented, however, the container 40 is equipped with a loading opening, preferably at the top thereof, associated with a respective opening/closing element, in order to enable the coffee beans to be topped-up.

As already indicated, according to a characteristic of the invention, the storage volume 10 is operationally associated with a cooling device 20. Note that FIG. 2 has a schematic character, with the depicted position of the components—such as the device 20—dictated by mere needs of clarity of representation.

In various embodiments, the cooling device 20 comprises a refrigerating assembly of known design and operation, and may include, for example, a compressor 21, a condenser 22, an expansion valve 23 (or a device of similar function) and an evaporator 24. Preferably, the cold side of the assembly, i.e. the evaporator 24, is operationally associated with a first electric fan 25; A second electric fan 26 can be operationally associated with the hot side of the assembly, i.e. the condenser 22, although this is not strictly necessary in some applications.

In various embodiments, the device or assembly 20 has its own casing 27, within which the corresponding components are positioned, such as the components 21-26. In preferential embodiments, the casing 27 of the assembly 20 defines an internal chamber that is divided—for example by means of an intermediate wall 27*a*—into two half-chambers, one housing the condenser 22 and the possible electric fan 36, and the other one housing the evaporator and its electric fan 25. The compressor 21 and the expansion valve 23 are preferably located in the half chamber of the condenser 22.

In various embodiments, the casing 27 of the refrigerating assembly 20 has relatively small dimensions, especially ranging from 350-550 mm (height)×300-400 mm (width)×350-400 mm (depth).

According to a preferential feature of the invention, the cooling device, exemplified here by the refrigerating assembly 20, has at least one first outlet for a flow of cooled air, connected via at least one first delivery duct to the inlet 42*a* of the gap 42, and at least one first inlet for a flow of air to be cooled, connected via at least one first return duct to the outlet 42*b* of the gap 42. Referring to FIG. 2, the above outlet and inlet of the assembly 20, designated by 28 and 29, respectively, are at the half-chamber housing the evaporator 24, in positions respectively downstream and upstream of the evaporator itself, having as reference the direction of the air circulation flow. As it can be seen, the outlet 28 is connected via a duct-schematized by the arrow AC—to the inlet 42*a* of the gap 42, while the outlet 42*b* of gap 42 is connected via a duct—schematized by the arrow WA—to the inlet 29.

Note that, in the figures, at least one inlet 42*a* and at least one outlet 42*b* are provided in a lower region and an upper region of the gap 42, respectively, but this is not an essential feature: in preferential embodiments of the invention, in fact, the inlet 42*a* and the outlet 42*b* are provided in an upper region and a lower region, respectively, of the gap 40, i.e. in such a way that an air circulation from top to bottom can be obtained in the gap.

In this way it is possible to obtain a circulation of air that crosses the gap, in a substantially closed path. The cold created by the evaporator is transferred to the air, which through the outlet 28 and the duct AC reaches the inlet 42*a* of the gap 42. This cooled air passes through the gap 42, so cooling the inner container 40 and the contents thereof, and takes heat therefrom, and then leaves the gap 42 via the outlet 42*b*, to return to the evaporator 24 via the duct WA and the inlet 29.

In various preferential embodiments, the circulation of the cooled air and of the air to be cooled is a forced circulation, obtainable thanks to the use of an electric fan, such as the fan indicated with 25. In the example, for this purpose, the outlet 28 and the inlet 29 of the assembly 20 are in positions respectively downstream and upstream of the electric fan 25, with reference to the direction of the air circulation flow. The electric fan 25 is configured for at least forcing the cooled air into the duct AC, and preferably also to suck the air to be cooled from the duct WA.

Of course, the fluid dynamic characteristics of the air circuit will be chosen in order to ensure that the gap 42 is involved as a whole by the flow of cooled air coming from the duct AC; for example, the sizing (such as the passage section) of the inlets 29, 42*a*, the outlets 28, 42*b*, the gap 42 and the ducts AC, WA will be determined according to the characteristics of the assembly 20, for example the flow rate of the electric fan 25.

In various preferential embodiments, the ducts AC and WA are thermally insulated ducts, in order to avoid heat losses (cold losses from the duct AC and heat losses from the duct WA).

The proposed mode of ventilated cooling for the containment volume 10, and in particular for the inner container 40, is very efficient from the energy viewpoint, and results in a low humidity, with an ensuing lower risk of condensation at the volume 10, which could contribute to the deterioration of the coffee beans. The fact that the cooled air produced by the assembly 20 is not blown directly inside the container 40, or on the coffee beans, avoids damaging the aromatic quality of the product, which would deprive it of organoleptic peculiarities; direct blowing on the beans, moreover, could cause a deterioration of the product due to the humidity of the cooled air and the condensation that would be generated on the internal walls of the container 40, due to the temperature difference between inside and outside.

In various preferential embodiments, the cooling arrangement that equips the dispenser 1 is configured for supplying the gap 42 with air at a temperature between 0 and 10° C., for example between 3 and 7° C. Preferably, the cooling arrangement is controlled in such a way that inside the container 40 there is a temperature of approximately between 5 and 7° C.; for this purpose, the sensor 16, or at least one temperature sensor 16, can be mounted to detect the temperature inside the container 40; in addition or alternatively, a temperature sensor 16 could be placed to detect the temperature in the gap 42.

As mentioned, in various embodiments, the at least one inlet 42*a* and the at least one outlet 42*b* of the gap 42 are in a lower region and in an upper region, respectively, of the outer casing 41, i.e., of the gap itself. With this solution, the coldest air coming from the duct AC (understood as air that has not yet performed a cooling function) firstly affects the lower area of the container 40 which, as mentioned, is in the immediate vicinity or in contact with the inlet of the dosing arrangement 11: in this way it also is possible to obtain a cooling by conduction of the dosing area, as explained below. Such an inlet and outlet position may be advantageous when the dosing arrangement 11 has also associated thereto also coffee bean grinding functions, in order to provide the nozzle 12 with coffee powder: this is in view of the fact that the possible grinding arrangement tends by its nature to develop heat during operation.

As mentioned, however, in preferential embodiments, alternative to those represented in the figures, the positions of the inlet and the outlet of the gap 42 is reversed, i.e., with at least one inlet 42*a* and at least one outlet 42*b* of the gap 42 in an upper region and in a lower region, respectively, of the outer casing 41, or of the gap itself. This inlet and outlet position may be preferable when the dosing arrangement 11 has no grinding functions (i.e., the coffee beans are supplied directly to nozzle 12).

The operation of the refrigerating assembly 20 (or other cooling device) is preferably controlled by the control unit 15, at least as a function of a temperature that exists near or at the storage volume 10. This detection of the internal temperature is carried out via the sensor 16, preferably in an area subject to refrigeration by the assembly 20: the detected temperature is compared with a pre-set threshold value, for example set when installing the dispenser 1, to operate the compressor 21 when necessary, and then carry out a typical refrigeration cycle. Preferably, for the purpose of controlling operation of the assembly 20, there are also provided means, in themselves known, to control the temperature at the outlet of the evaporator 24 and to control the compressor 21 with an ON/OFF or PID logic, according to methods widely known in the refrigeration and environmental conditioning field. In various embodiments the aforementioned threshold temperature is greater than 0° C., particularly comprised between +5 and +25° C., preferably between +15 and +20° C., depending on the desired level of preservation of the product; for example, a preferential threshold value is approximately +18° C., which is a temperature suitable for preventing rapid oxidation and/or rancidity of the coffee beans.

Of course, it is possible to provide the unit 20 with its own control unit, instead of implementing the corresponding control logic on the control unit 15 of the dispenser 1, in which case the sensor 16 will be connected in signal communication with the control unit of the refrigerating unit 20.

In order to exemplify a possible operating cycle of the cooling system, let us assume that:

the temperature outside the dispenser 1, on an average summer day in Italy, reaches the value of about 33-34° C.;

the pre-set threshold temperature is equal to 18° C.

When, through the sensor 16, a temperature equal to or higher than the threshold temperature of 18° C. is detected, the assembly 20 is activated for the production of cooled air. The evaporator 24 then cools the air which, through the electric fan 25 and the outlet 28, is forced into the duct AC, to reach the gap 42 by means of the inlet 42*a*. This cold air, indirectly coming into contact with warmer objects, represented by the container 40 and the beans contained thereinto, heats up as it rises or descends in the gap 42 (depending on the position of the inlet 42*a* and the outlet 42*b*), and then returns to the assembly 20 (by means of the outlet 42*b*, the duct WA and the inlet 29), to be cooled again to the desired temperature, and then brought back inside the gap 42. Of course, like any physical system, the desired temperature for cooling the container 40 and its contents CB is reached only after passing an initial thermal transient.

In various embodiments, the at least one temperature sensor 16 is positioned in the region where the dosing arrangement 11 is located, in order to ensure that the assembly 20 is activated and deactivated, for the purpose of cold generation, when the temperature in that region is equal to or greater than the pre-set threshold value.

The indicated positioning region of the sensor 16 is considered preferential because, for the purpose of implementing the invention, the dosing arrangement 11 can represent a critical point for the optimal preservation of coffee. The dosing arrangement 11 is in fact a component that, by its nature, tends to originate heat (for example due to the operation of its electric actuators). At the inlet mouth of the dosing device 11—in which, as mentioned, the outlet 40*a* of the container 40 is preferably directly coupled—or in its immediate vicinity, an amount of coffee beans may possibly remain which, if exposed to unsuitable storage conditions—could deteriorate very quickly, with a sudden increase in its oxidative state.

For these reasons, the temperature detection according to which the refrigerating assembly 20 is controlled can take place in the area of the dosing arrangement 11, even if this is not an essential characteristic. Moreover, this does not exclude that, in addition or alternatively, a temperature sensor can be placed in the region of the storage volume 10 (for example inside the gap 42, or in contact with the casing 41—including its door or lid 41*b*—or in contact with the container 40), or at the return duct WA.

It should be considered that, in the solution according to the invention, the cooling of the coffee beans is obtained by pure conduction, i.e., it is an "indirect" cooling, which avoids a flow of cold air directly on the coffee beans, for the reasons set out above, related for example to the loss of aromatic quality. As a matter of fact, the cooled air circulating in the gap 42 cools the walls of the inner container 40, with part of the cold being transferred to the "peripheral" beans and air that are directly in contact with these walls; these "peripheral" beans and air in turn transfer part of the cold to the adjacent beans and air, and so on towards the centre of the container 40.

This cooling mode has the consequence that even any coffee beans remained at the inlet mouth of the dosing arrangement 11, and at least part of the dosing arrangement itself, are also cooled by conduction or natural convection. However, this cooling may not be sufficient for cooling any beans that remained in the dosing area. For this reason, in various embodiments, the cooling arrangement of the dispenser 1 is configured to cool at least part of the dosing arrangement 11.

The at least partial cooling of the dosing arrangement 11 can be carried out in a direct and active manner. Possible embodiments of this type are shown in FIGS. 3-7.

Figures 3, 4:
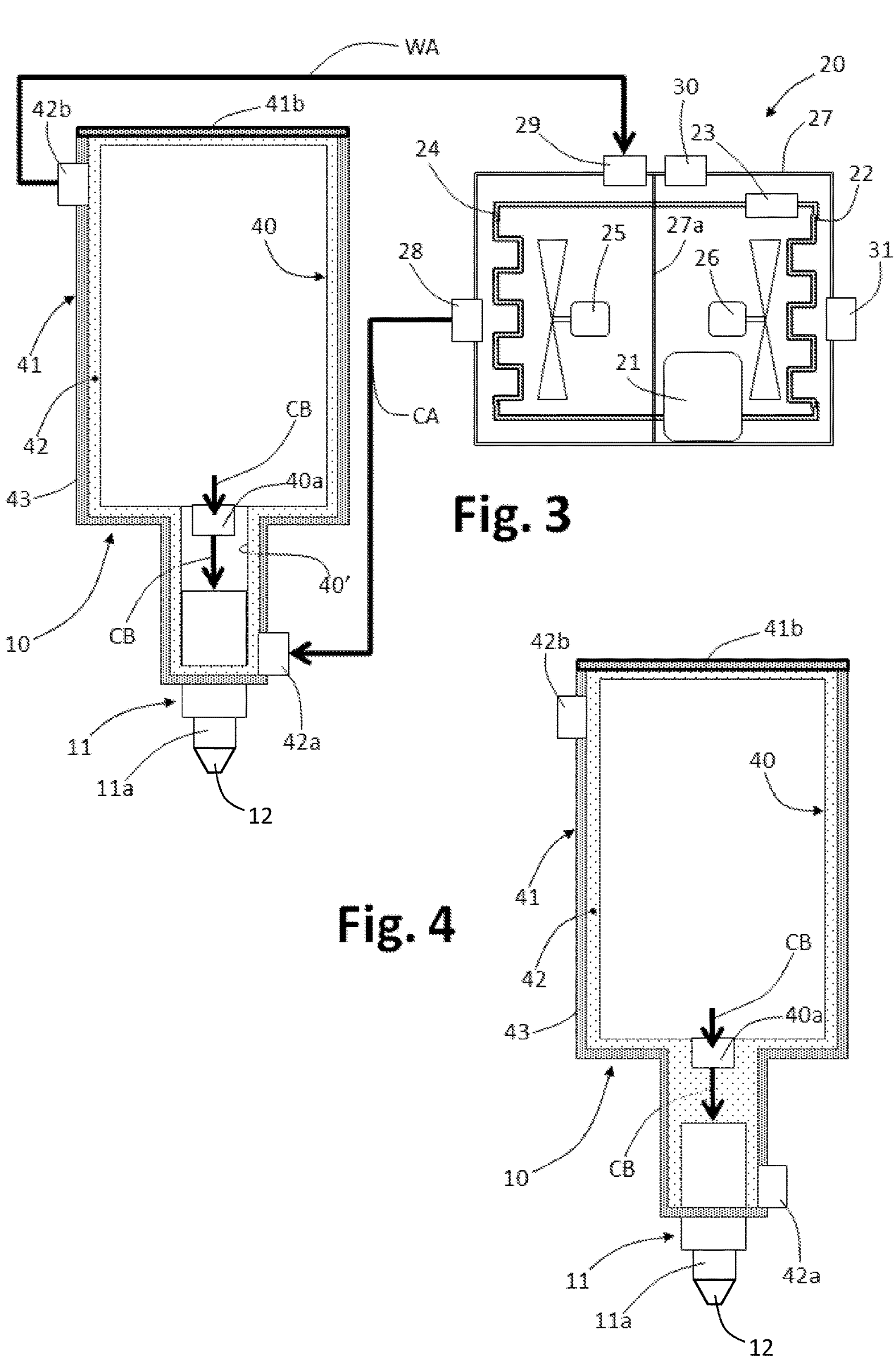
FIGS. 3-7 are schematic representations of some elements of a coffee bean dispenser according to variant embodiments implementation of the invention.

In the case of FIG. 3, the outer casing 42 also at least partially surrounds the dosing arrangement 11. For such a case, for example, an internal jacket 40' can be provided, that at least partially surrounds the dosing arrangement 11; this jacket 40' can be configured as a separate component or as a part protruding downward from the bottom of the container 40. The outer casing 41 is shaped to surround the jacket 40', so that a respective part of the gap 42 extends therebetween. Also in such a solution the inlet 42*a* can be located in the lower part of the gap 42, here the part thereof that at least partially surrounds the dosing arrangement 11. As it can be seen, with such a type of solution, the cooled air introduced into the gap 42 allows to maintain at a controlled temperature even at least a part of the dosing arrangement 11. By the way, even in the case of FIG. 3, the positions of the inlet 42*a* and the outlet 42*b* could be reversed with each other.

The jacket 40', although preferential, could still be omitted, as in the example of FIG. 4, wherein the outer casing 41 is shaped to define a volume in fluid communication with the gap 42, in which the part of interest of the dosing arrangement 11 extends.

Of course, it is also possible to provide several inlets 42*a* for the cooled air, for example one at the dosing arrangement 11 and one at the lower area of the container 40 (for example in the position shown in FIG. 2), as well as several outlets 42*b*, for example one at the dosing arrangement 11 and one at the upper part of the container 40 (for example in the position shown in FIG. 2). Also in such a case the positions of the inlet 42*a* and the outlet 42*b* could be reversed with each other.

Via corresponding ducts, preferably thermally insulated, the cooled air can be fed in series (in derivation) or in parallel to the inlets of the gap, and similarly the air to be cooled can be withdrawn in series or in parallel from the outlets of the gap.

Figure 5:
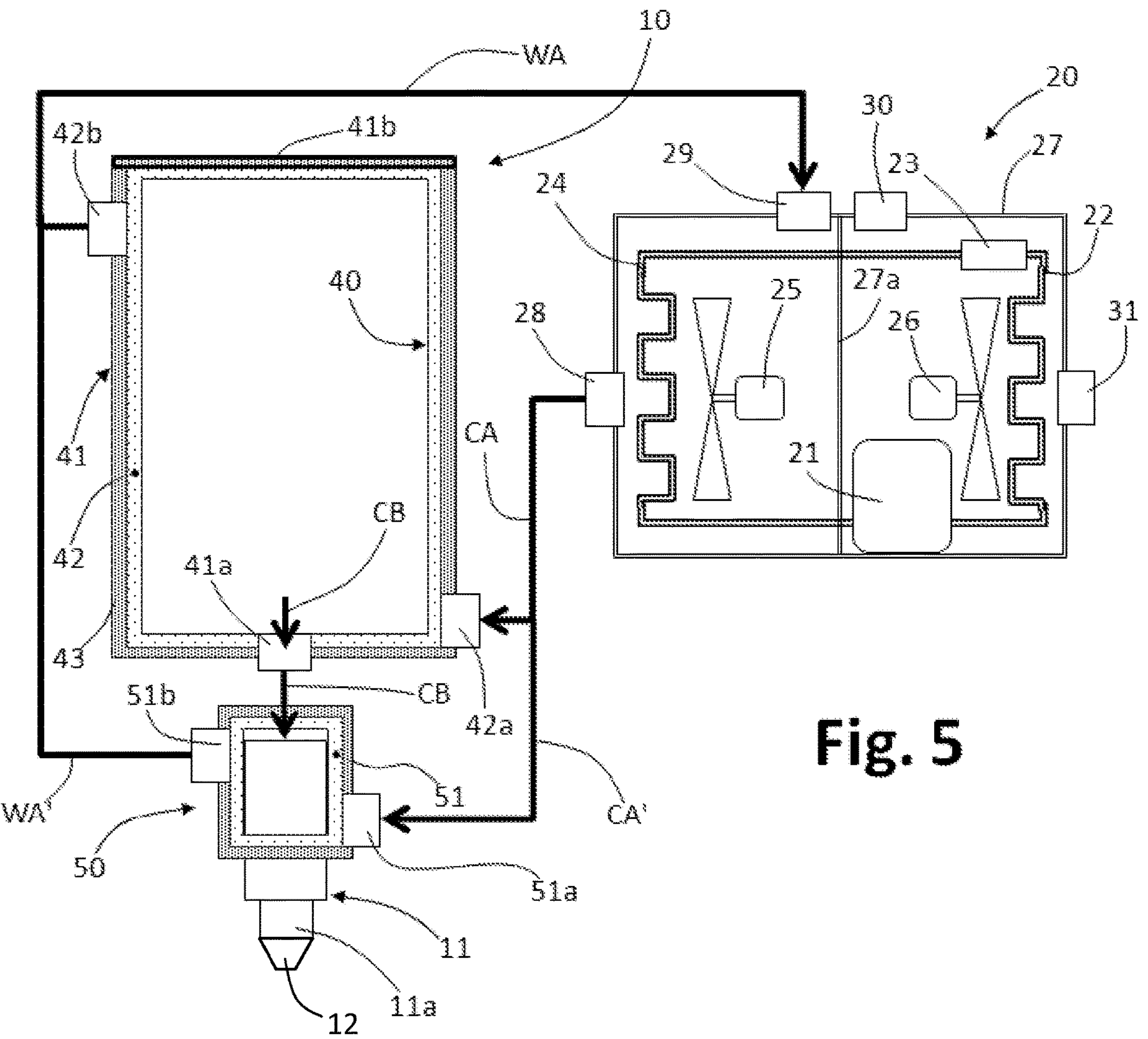

In the case of FIG. 5, the cooling arrangement comprises a second casing, designated by 50, which at least partially surrounds the dosing arrangement 11 and in which a respective gap 51 is defined, the latter having at least one respective inlet 51*a* and at least one respective outlet 51*b*. In embodiments of this type, the refrigerating unit 20 is configured to force cooled air also at the inlet 51*a*, and to receive air to be cooled from the outlet 51*b* of the gap 51.

In the case of embodiments of the type shown in FIG. 5, the cooling arrangement comprises a second delivery duct, schematized by the arrow CA', and a second return duct, schematized by the arrow WA', connected to the inlet and the outlet of the gap 51, respectively. These additional ducts CA', WA' are also preferably thermally insulated ducts, for the reasons already explained.

In the example in FIG. 5 the delivery duct AC' and the return duct WA' are formed by respective branches of the ducts AC and WA, such that the refrigerating assembly 20 can be provided with a single outlet 28 and a single inlet 29, for the circulation of the cooled air and of the air to be cooled. By contrast, in the case of FIG. 6, the refrigerating assembly 20 has a second outlet 28' for the cooled air, connected through the delivery duct AC to the inlet of the gap 51, and a single inlet 29 for the air to be cooled, with the ducts WA' and WA connected in series.

In this case, therefore, two flows of cooled air are supplied in parallel to the two gaps 42 and 51, while the flow of air to be cooled coming from the gap 51 is conveyed to the assembly 20 together with the flow of air to be cooled coming from the gap 42. Obviously it is also possible to provide the assembly with a second inlet 29', to which the duct WA' is directly connected, as schematized by hatching in FIG. 6, in order to fed in parallel the two flows of air to be cooled to the assembly 20.

Figure 6:
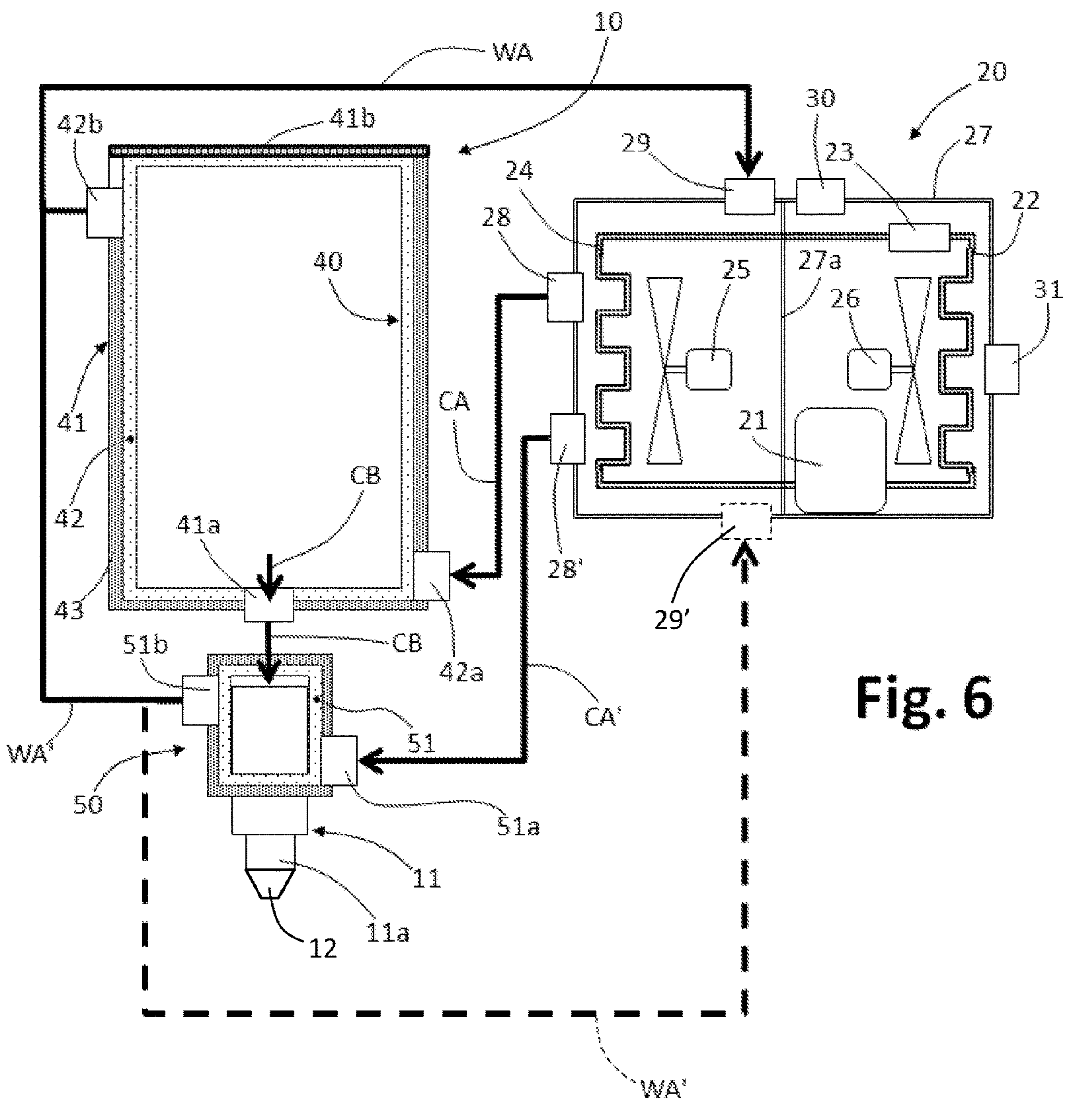

Of course, also in the case of FIGS. 5 and 6 the positions of the inlet 42*a* and the outlet 42*b* could be reversed with each other.

In general, therefore, as an alternative to a parallel connection between the outlets 28, 28' of the assembly 20 and the inlets 42*a*, 51*a* of the gaps 42, 51, on the one hand, and between the inlets 29, 29' of the assembly 20 and the outlets 42*b*, 51*b* of the gaps 42, 51, on the other hand, also "hybrid" circuit solutions are possible, that is, with:

one of the delivery duct CA' and the return duct WA' which is formed by a respective branch of the delivery duct CA or the return duct WA, respectively, and the other one of the delivery duct CA' and the return duct WA' which is connected to a respective outlet 28' or a respective inlet 29', respectively.

Figure 7:
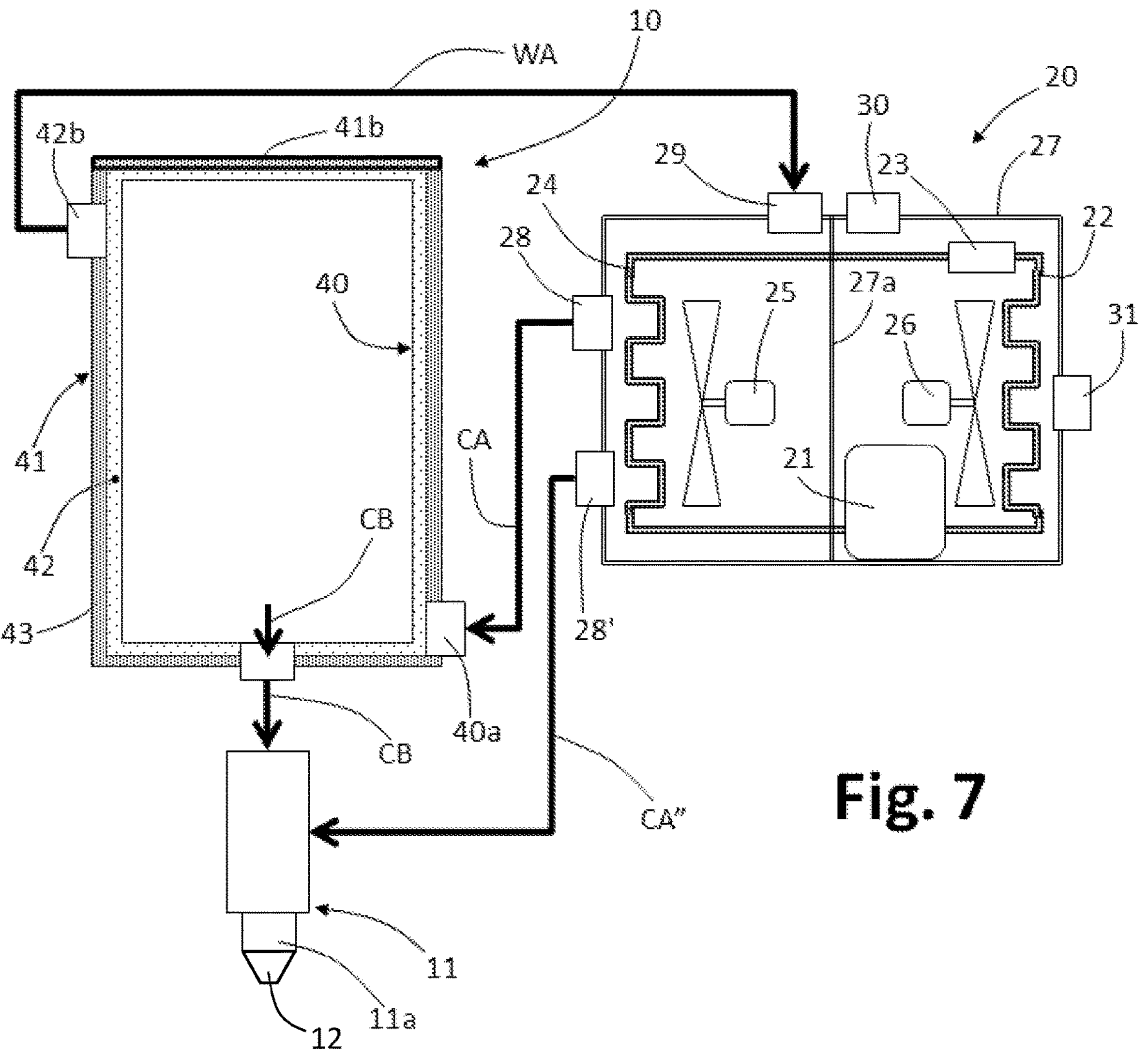

In the variant embodiment of FIG. 7, the cooling arrangement of the dispenser 1 is designed to directly direct a flow of cooled air on at least one part of the dosing arrangement 11, i.e., without the mediation of a gap. In the case exemplified, the assembly 20 has a second outlet 28' for cooled air that, via a duct schematized by the arrow CA", is blown directly on the dosing arrangement 11.

Of course, in relation to the embodiments exemplified with reference to FIGS. 3-7 the above indications apply, in relation to the prearrangement of the fluid dynamic characteristics of the air circuit.

It should also be noted that the device or assembly 20 is preferably provided with a ventilation inlet and a ventilation outlet. As mentioned, preferably, the assembly 20 can also comprise a second electric fan 26 associated with the condenser 22, for the suction of air from the environment, for the cooling of the condenser 22, and for the expulsion into the environment of air that has been heated by the condenser 22. In the examples depicted, the casing 27 of the assembly 20 has, particularly at the half-chamber housing the condenser 22, a respective inlet 30 and a respective outlet 31, in positions downstream and upstream of the condenser 22, respectively, having as reference the direction of the air circulation flow.

Preferably, the dispenser 1 will be configured such that it can be at least partially disassembled (for example in relation to the components that make up the storage volume 10 and/or the dosing arrangement 11), in order to facilitate maintenance operations and/or periodic cleaning.

The characteristics of the present invention are clear from the above description, as are its advantages. It is clear that numerous variants are possible for the person skilled in the art to the dispenser described as an example, without departing from the scope of the invention as defined by the claims that follow.

It will be appreciated, for example, that the dispenser 1 can include a number of storage volumes 10, for example to contain different types of coffee beans, which can be cooled by means of one and the same cooling arrangement, as described above. In this perspective, in possible embodiments, a plurality of containers of the type previously indicated by 40 could be housed in one and the same outer casing of the type indicated above by 41, so as to define a single gap having the functions of the gap indicated by 42, which surrounds at least in part each of said containers, each provided with its own outlet 40*a*.

The invention has been described with particular reference to the dispensing of coffee beans, but—as mentioned—in possible variants embodiments the dispenser 1 can be configured for the dispensing of coffee powder, obtained from the beans contained in the storage volume 10. In applications of this type, therefore, downstream of the outlet of the container 40 and upstream of the dispensing spout 12 an electric grinder device is provided, designed to grind the coffee beans supplied from the volume 10. The grinder device can be of a design and an operation in itself known, preferably configured for (or having associated a system for) dosing at input a dosed amount of coffee beans, or for dosing at output a predefined amount of ground coffee. Devices of this type, which integrates dosing and grinding functions, are well known and generally identified as grinder-dosers.

From this point of view, what has been described above in relation to the possibility of conditioning at least part of the dosing arrangement 11, has to be considered equally valid in the case of a grinding device or a grinding-dosing device. Therefore, referring to the figures, the reference numeral 11 previously used can also be understood as designated as designating a grinder-doser.

As already mentioned, a grinding device is a component that, by its nature, tends to originate heat, both due to the operation of a corresponding electric motor, and due to the action carried out by its grinding blades. In addition, in the grinding area, even after dispensing through the mouth 12, a small amount of ground coffee may persist which, if exposed to unsuitable storage conditions, deteriorates rapidly. The cooling of the grinder that possibly equips the dispenser 1 is therefore particularly advantageous.

The cooling device can be of a type different from the one exemplified, including a refrigerating assembly unit. For example, in possible alternative embodiments, the cooling device may be of the heat pump type and/or comprise one or more Peltier cells, or similar elements of thermal conditioning. Even in solutions of this type, an air recirculation system can be advantageously provided, for example of one of the types described above.

The invention claimed is:

1. A dispenser of coffee in solid form, comprising:

a storage volume, to contain coffee beans, a dosing arrangement, arranged downstream of an outlet of the storage volume and configured for releasing dosed amounts of coffee beans from the storage volume, a dispensing mouth, arranged downstream of an outlet of the dosing arrangement, wherein the dispensing mouth is configured for dispensing the dosed amounts of coffee beans to an exterior of the dispenser for collection by a user, a user interface, operable by the user to set a request for a dosed amount of coffee beans to be dispensed through the dispensing mouth, and a cooling arrangement, configured for cooling the coffee beans contained in the storage volume, wherein the storage volume comprises an inner container, for receiving and storing the coffee beans, and the cooling arrangement comprises a first outer casing which surrounds at least partially the inner container, at least part of a first gap being defined between the inner container and the first outer casing, the cooling arrangement further including a cooling device configured for cooling the first gap, wherein the first gap has at least one first inlet and at least one first outlet, and the cooling device has at least one first outlet for a flow of cooled air connected via at least one delivery duct to the at least one first inlet of the first gap, and at least one first inlet for a flow of air to be cooled connected via at least one first return duct to the at least one first outlet of the first gap, so as to define a substantially closed air recirculation path through the first gap, and wherein the cooled air circulates in the first gap outside the inner container and is not blown directly inside the inner container onto the coffee beans.

2. The dispenser according to claim 1, wherein the first outer casing comprises a layer of thermally insulating material.

3. The dispenser according to claim 1, wherein:

the at least one first inlet and the at least one first outlet of the first gap are in a lower region and in an upper region, respectively, of the first outer casing, or else the at least one first inlet and the at least one first outlet of the first gap are in an upper region and in a lower region, respectively, of the first outer casing.

4. The dispenser according to claim 1, wherein the cooling device comprises at least one electric fan configured for forcing cooled air into a delivery duct of the at least one delivery duct and for sucking air to be cooled from a first return duct of the at least one first return duct.

5. The dispenser according to claim 1, wherein the cooling arrangement is further configured for cooling at least one part of the dosing arrangement.

6. The dispenser according to claim 5, wherein the first outer casing surrounds at least partially also the dosing arrangement, to define a corresponding part of the first gap that surrounds at least partially the dosing arrangement, or else to define a volume in fluid communication with the first gap, into which the dosing arrangement is at least partially set.

7. The dispenser according to claim 5, wherein:

the cooling arrangement comprises a second casing which surrounds at least partially the dosing arrangement, the second casing delimiting at least part of a second gap having at least one respective inlet and at least one respective outlet, and the cooling device is configured for forcing cooled air to the at least one inlet of the second gap and for receiving air to be cooled from the at least one outlet of the second gap.

8. The dispenser according to claim 7, wherein the first gap has at least one first inlet and at least one first outlet, and the cooling device has at least one first outlet for a flow of cooled air, connected via at least one delivery duct to the at least one first inlet of the first gap, and at least one first inlet for a flow of air to be cooled, connected via at least one first return duct to the at least one first outlet of the first gap, and the cooling arrangement comprises a second delivery duct and a second return duct connected to the at least one inlet and the at least one outlet of the second gap, respectively, and wherein:

the second delivery duct and the second return duct are formed by respective branches of the first delivery duct and of the first return duct, respectively, or else the cooling device has a second outlet for cooled air, connected via the second delivery duct to the at least one inlet of the second gap, and a second inlet for air to be cooled, connected via the second return duct to the at least one outlet of the second gap, or else one of the second delivery duct and the second return duct is obtained by a respective branch of the first delivery duct or of the first return duct, respectively, and the other one of the second delivery duct and the second return duct is connected to a second outlet for cooled air or to a second inlet of air to be cooled, respectively, of the cooling device.

9. The dispenser according to claim 5, wherein the cooling arrangement is prearranged for addressing a further flow of cooled air on said at least one part of the dosing arrangement.

10. The dispenser according to claim 1, also comprising a control unit in signal communication with at least one temperature sensor, the control unit being prearranged for controlling the cooling device at least as a function of a temperature detected via the at least one temperature sensor.

11. The dispenser according to claim 1, wherein the cooling device comprises a refrigerating assembly having an electric fan associated to a condenser, for sucking through a ventilation inlet air from an environment outside of a casing of the refrigerating assembly, for cooling the condenser, and for expelling in said environment air that has taken heat from the condenser, through a ventilation outlet of the casing of the refrigerating assembly.

12. The dispenser according to claim 1, wherein:

the at least one first delivery duct and the at least one first return duct are each provided with a thermally insulating layer.

13. The dispenser according to claim 1, wherein the cooling device comprises at least one from among:

a refrigerating assembly, a heat-pump device, one or more Peltier cells.

14. A dispenser of coffee in solid form, comprising:

a storage volume, to contain coffee beans, a dosing arrangement, arranged downstream of an outlet of the storage volume and configured for releasing dosed amounts of coffee powder, a dispensing mouth, arranged downstream of an outlet of the dosing arrangement, wherein the dispensing mouth is configured for dispensing the dosed amounts of coffee powder to an exterior of the dispenser for collection by a user, a user interface, operable by the user to set a request for a dosed amount of coffee powder to be dispensed through the dispensing mouth, a cooling arrangement, configured for cooling the coffee beans contained in the storage volume, wherein the dosing arrangement comprises a grinding device arranged upstream of the dispensing mouth and operable for receiving coffee beans from the storage volume and grinding said coffee beans into coffee powder to be dispensed through the dispensing mouth, wherein the storage volume comprises an inner container, for receiving and storing the coffee beans, and the cooling arrangement comprises a first outer casing which surrounds at least partially the inner container, at least part of a first gap being defined between the inner container and the first outer casing, the cooling arrangement further including a cooling device configured for cooling the first gap, wherein the first gap has at least one inlet and at least one outlet, and the cooling device has at least one outlet for a flow of cooled air connected via at least one delivery duct to the at least one inlet of the first gap, and at least one inlet for a flow of air to be cooled connected via at least one return duct to the at least one outlet of the first gap, so as to define a substantially closed air recirculation path through the first gap, and wherein the cooled air circulates in the first gap outside the inner container and is not blown directly inside the inner container onto the coffee beans.

* * * * *